United States Patent Office 2,948,616
Patented Aug. 9, 1960

2,948,616

MALT LIQUOR AND METHOD OF PREPARING THE SAME

George H. Kinsman, Wauwatosa, and Nison N. Hellman, Milwaukee, Wis., assignors to Basic Products Corporation, Milwaukee, Wis., a corporation of Wisconsin No Drawing. Filed May 15, 1958, Ser. No. 735,390

5 Claims. (Cl. 99—48)

The present invention relates to the preparation of beer and ale and more particularly, to the preparation of packaged malt liquors such as beers and ales.

In the packaging of beers and ales, there has long been the problem of oxidation reactions which take place in the beverage both before and after packing. These reactions materially affect the taste, color and other properties of the beverage, and as a result affect consumer acceptance of the product. The containers in which these beverages are packaged are ordinarily not filled to capacity, and in such containers the head space remaining above the liquid level generally contains air and carbon dioxide gas, the proportion of air depending upon the method and manner of filling. In addition, there is ordinarily a considerable amount of air dissolved in the beverage, most of which is taken into solution during production and packaging. This air in the beverage and in the head space is a source of oxygen which is believed to chemically combine with certain ingredients of the beverage to produce deterioration of flavor, taste, coloring and in general affect consumer acceptability. The extent of the deterioration is believed to depend upon a number of factors including time, temperature, exposure to light, and the presence of certain ingredients in the liquid.

It is the primary object of the present invention to provide an improved, readily obtainable antioxidant for malt liquors and particularly for beer and ale. More specifically, it is an object of the invention to provide an antioxidant substance for improving the stability of malt liquors, which substance not only is wholesome and completely unobjectionable for food use, but also does not impart any odor or taste of its own to the beer nor accentuate or mask flavors derived from the liquor constituents.

Another object of the present invention is to provide an antioxidant of the foregoing character which is effective in preventing the oxidation of any natural constituents of the liquor and which is stable before use, in transit, and during storage. Still another object is to provide antioxidants of the above character which need be used only in trace or very small quantities yet which can be simply detected and determined for control purposes. Still a further object is to provide an antioxidant which is easily used and does not require complicated procedures or processes for its addition.

A more specific object of the invention is to provide an improved antioxidant for beer, ale and other malt liquors comprising 2,4,5-trihydroxybutyrophenone. More particularly, it is an object of the present invention to provide an improved method of stabilizing beers, ales and other malt liquors against oxidation comprising the addition to the beverage of 2,4,5-trihydroxybutyrophenone, whereby the original flavor, taste, appearance and other desirable characteristics of the beverage are maintained over longer periods of time than heretofore obtainable with known antioxidants, even though substantial amounts of air or other sources of chemically combinable oxygen are present in the containers of the beverages.

For convenience in the following description of the invention reference will be made to beer alone. It should be understood, however, that the description applies equally to ales and other malt liquors.

In accordance with the present invention, for the purpose of stabilizing beer against oxidation without substantially affecting the taste, color and other desirable characteristics of the beverage, there is added to the beer at any suitable stage in its production, for example before packaging, 2,4,5-trihydroxybutyrophenone (THB). The actual amount of the antioxidant compound 2,4,5-trihydroxybutyrophenone (THB) added depends upon a number of factors including the amount of air in the head space of the package, the amount of air entrapped, occluded or dissolved during production of the beer, treatment or packaging of the beverage, and variations in the beer itself. For instance, beers contain a number of natural scavengers and natural antioxidants which are not sufficient in themselves for the protection of the beer against oxidation. These natural substances will, however, influence the amount of antioxidant material that may or need be added.

Accelerated oxidation tests have been made upon beer, and the examples set forth below illustrate the effects of various amounts of the THB antioxidant compound. For making these tests, 24 bottle cases of commercially obtainable pasteurized beer as prepared for customers' selection and consumption were purchased from a retail source. In addition, in one example, bottles were selected at random from a batch prepared in a pilot brewery. The oxidation test is a standard 14 day test, and three independent assay techniques are employed for evaluating the beer after the expiration of the test period. The results of these tests may be extrapolated over the expected shelf life of the packaged beer to indicate the effectiveness of the protection offered against oxidation and the production of off-taste and other undesirable characteristics in the beer.

The assay techniques include a simple organoleptic taste test, and a standard color test in which the color comparison was determined using a standard Lumetron colorimeter, and the readings obtained converted to Lovibond units. The Lovibond units were obtained by using a graph prepared from Dichromate color standards as outlined in the A.S.B.C. Standard Methods, 5th Edition, page 18 (1949). The third assay technique provides a recognized standard in the brewing industry for determining state of oxidation. The value obtained, known as the Indicator-Time Test, or I.T.T. value, is the time in seconds required for a given quantity of a beer to decolorize a certain percentage of an added indicator, as judged by comparison with suitable standards. This value can be used as a comparative indication of the rate at which the samples are oxidized with the corresponding development of the oxidative flavor. The test is conducted in ordinary test tubes; and the colors obtained are compared in a block comparator. The standard procedure for obtaining I.T.T. values is outlined in detail in the "Wallerstein Laboratories Communications," vol. 2, No. 5, page 5 (April 1939), and as reprinted in the "Journal of the Institute of Brewing" (London), vol. 45, page 243. The indicator is a stabilized I.T.T. indicator, such as a prepared solution of sodium 2,6-dichlorobenzenone indophenol.

In each of the examples, the standard 12-ounce bottles of beer used were those purchased from an independent source, or selected at random from those prepared by means of a laboratory pilot brewery. Two control bottles selected at random from the particular cases were set aside without opening and permitted to remain undisturbed for the 14-day test period for comparison purposes. An "oxidized control" bottle was selected and the carbon dioxide in the head space was displaced with atmospheric air in order to accelerate the oxidation reactions in the beer. This was done by selecting a glass rod having an outer diameter slightly less than the inner diameter of the neck of the bottle and inserting the rod into the bottles to substantially fill the head space and force out the $CO_2$ which it contained. Removal of the rod then permitted air to enter the head space. The "oxidized control" bottle was then re-capped without the addition of any further material.

A number of test samples were then selected. In order to accelerate the oxidation of these samples, the carbon dioxide in the head space was removed in the same manner as that of the oxidized control sample, and air was permitted to displace the $CO_2$. The above described THB antioxidant was added as a solid material in weighed quantities by dropping directly into the bottle. To test the effectiveness of THB as an antioxidant, different quantities were added to different bottles. All equipment used in preparing the samples, the top of all test bottles, including the "oxidized control" bottle, and the the caps were maintained sterile with ethanol to insure that no bacteria were added by the opening of the bottle to the atmosphere. Each of the test samples and controls were shaken vigorously and stored at room temperature. The shaking operation was repeated, for about one-half minute, once each day for a period of fourteen days.

After the 14-day period had expired, the control samples and test samples were then assayed under the three techniques described above; that is, the samples were tasted, a color test was made, and an I.T.T. assay was completed upon each of the samples.

The following examples set forth the results of the oxidation tests, made upon beer samples with the THB added in 10 milligram increments to the 12 fluid ounce bottles, and converted to conventional units of milligrams per liter for tabular comparative purposes. It will be understood that the oxidation is accelerated by adding the excess oxgen in place of $CO_2$ in the head space.

EXAMPLE I

*Beer from pilot brewery, in clear bottles*

| THB Added, in Mg./liter | Assay After 14 days | | |
|---|---|---|---|
| | Taste | Color in Lovibond Units | I.T.T. in Seconds |
| None (undisturbed control) | Normal | 3.14 | 1050 |
| None (oxidized control) | Oxidized | 3.66 | 3016 |
| 28.2 | V. sl. Oxidized | 3.22 | 1360 |
| 56.4 | Normal | 3.12 | 1222 |
| 84.6 | Normal | 3.06 | 1105 |

EXAMPLE II

*Commercially obtained beer in clear bottles*

| THB Added, in Mg./liter | Assay After 14 days | | |
|---|---|---|---|
| | Taste | Color in Lovibond Units | I.T.T. in Seconds |
| None | Normal | 3.05 | 1091 |
| None (oxidized control) | Oxidized | 4.20 | 2135 |
| 28.2 | V. sl. oxidized | 3.16 | 760 |
| 56.4 | Normal | 3.12 | 675 |
| 84.6 | Normal | 3.14 | 512 |
| 112.8 | Slight off Flavor | 3.22 | 610 |

EXAMPLE III

*Commercially obtained beer in brown bottles*

| THB Added, in Mg./liter | Assay After 14 days | | |
|---|---|---|---|
| | Taste | Color in Lovibond Units | I.T.T. in Seconds |
| None | Normal | 3.18 | 540 |
| None (Oxidized control) | Oxidized | 3.41 | 2460 |
| 5.06 | V. sl. oxidized | 3.26 | 720 |
| 11.3 | Normal | 3.22 | 800 |
| 16.9 | Normal | 3.32 | 775 |
| 28.2 | Normal | 3.26 | 930 |
| 56.4 | Normal | 3.22 | 1011 |
| 84.6 | Normal | 3.14 | 600 |
| 112.8 | Normal | 3.18 | 575 |

It will be apparent that as little as 10 milligrams per 12-ounce bottle, or 28.2 milligrams per liter, will provide excellent antioxidant properties to beer when compared with both an oxidized control and a normal control sample. In fact, a noticeable improvement in taste was noted with an amount as small as 5 milligrams THB per liter.

In further assay tests, THB was added in amounts of 189.2 mg./liter and 245.6 mg./liter. These amounts of THB were found to imprt excellent antioxidant characteristics to the beverage, and with even as much as 245.6 mg./liter (80 mg./12 oz. bottle) only a slight off flavor due to the presence of the relatively large amount of THB could be detected.

It will be further apparent that the oxidized control sample in each of the various examples provided a considerably higher I.T.T. value, ranging from 3 to 5 times the value of the undisturbed control sample. The examples also show that the very small amount of THB added to each sample maintained the I.T.T. value, as well as the taste and color assay values at a desirable level. As pointed out above, the tests were carried out by accelerating the oxidation of the samples. However, the results may be extrapolated with accuracy over an expected shelf life of the product.

The actual amount of additive required appears to vary in accordance with the techniques of manufacture and production and consistents inherent with each brewery. The maximum amount also would governed by the relative cost and by certain toxicity standards established by the U.S. Food and Drug Administration.

In carrying out the invention, the THB is added in such quantities that the antioxodizing characteristics are retained over any normal storage period. Whle the amount of THB to be added depends to some extent on the air present in the package, practically this factor is secondary to the time factor and, in fact, even a small amount of the THB is sufficient for a wide range of storage conditions and oxygen content.

The 2,4,5-trihydroxybutyrophenone employed as described above may be prepared in suitable ways. Several methods for preparing this compound are described in U.S. Patent 2,759,828.

It has not been possible to test the many compounds of the class of THB, such as, for example, those disclosed in the aforementioned patent, in order to determine their utility as stabilizers of malt beverages. It is not unlikely that certain of these may have effectiveness for this purpose. Obviously, if one skilled in the art, after reading this specification, were to test such a compound and find it suitable for the purpose, the use of such equivalent material would be within the scope and spirit of the appended claims.

We claim as our invention:

1. In the method of producing malt liquors such as beers and ales the step which consists of adding thereto the compound 2,4,5-trihydroxybutyrophenone.

2. The method of producing malt liquors such as beers and ales comprising the step of adding thereto 2,4,5-trihydroxybutyrophenone.

3. A malt liquor such as beer and ale characterized by the presence therein of 2,4,5-trihydroxybutyrophenone in an amount such as to effect substantial stabilization thereof against oxidation without substantially affecting its wholesomeness, flavor, appearance and other desirable beverage characteristics.

4. Malt liquor such as beer and ale characterized by the presence therein of 2,4,5-trihydroxybutyrophenone in an amount of at least about 28 milligrams per liter and having an upper limit determined by the wholesomeness, flavor and appearance of said malt liquor.

5. Malt liquor such as beer and ale characterized by the presence therein of 2,4,5-trihydroxybutyrophenone in an amount of at least 5 milligrams per liter.

References Cited in the file of this patent

UNITED STATES PATENTS 2,759,828  Bell et al. _____ Aug. 21, 1956